United States Patent [19]

Falk et al.

[11] Patent Number: 4,664,281

[45] Date of Patent: May 12, 1987

[54] EXPLOSION PROOF ENCLOSURE

[75] Inventors: Edward J. Falk, St. Louis; Lawrence J. Brombolich, Chesterfield, both of Mo.

[73] Assignee: Killark Electric Manufacturing Co., Mo.

[21] Appl. No.: 839,446

[22] Filed: Mar. 10, 1986

Related U.S. Application Data

[63] Continuation of Ser. No. 787,711, Oct. 15, 1985, abandoned, which is a continuation of Ser. No. 634,822, Jul. 26, 1984, abandoned.

[51] Int. Cl.$^4$ .......................... B65D 1/42; B65D 45/10; H02G 3/08; H02G 3/14
[52] U.S. Cl. .................................... 220/3.8; 174/50; 174/52 R; 174/58; 220/3.9; 220/72; 220/88 R; 220/327; 220/378
[58] Field of Search ................... 220/327, 3.8, 72, 74, 220/88 R, 378, 328, 3.9, 3.92, 70; 174/50, 52 S, 52 R, 58; 292/256.71, 256.73

[56] References Cited

U.S. PATENT DOCUMENTS

| | | | |
|---|---|---|---|
| 1,705,131 | 3/1929 | Miller | 220/327 |
| 2,113,776 | 4/1938 | Smith | 220/378 X |
| 3,018,127 | 1/1962 | Dobrosielski et al. | 220/327 X |
| 3,240,380 | 3/1966 | Larry | 220/327 X |
| 4,063,831 | 12/1977 | Meuret | 220/327 X |

FOREIGN PATENT DOCUMENTS

| | | | |
|---|---|---|---|
| 6413957 | 6/1965 | Netherlands | 292/256.71 |
| 569165 | 5/1945 | United Kingdom | 174/50 |

Primary Examiner—Allan N. Shoap
Attorney, Agent, or Firm—Rogers, Howell, Moore & Hafkenkamp

[57] ABSTRACT

An explosion proof electrical enclosure has a relieved joining flange at the junction between the cover and the body of the enclosure. The relieved portion provides an area reducing the bolt load in the event the enclosure is subjected to an internal explosion. As a result, fewer bolts may be used to join the enclosure, reducing the cost of the enclosure, increasing the convenience of access to the enclosure and reducing the labor required to remove or install the cover. The cover of the enclosure has increased stiffening structure at the corners so that the bolts in the corners of the enclosure may be eliminated.

5 Claims, 8 Drawing Figures

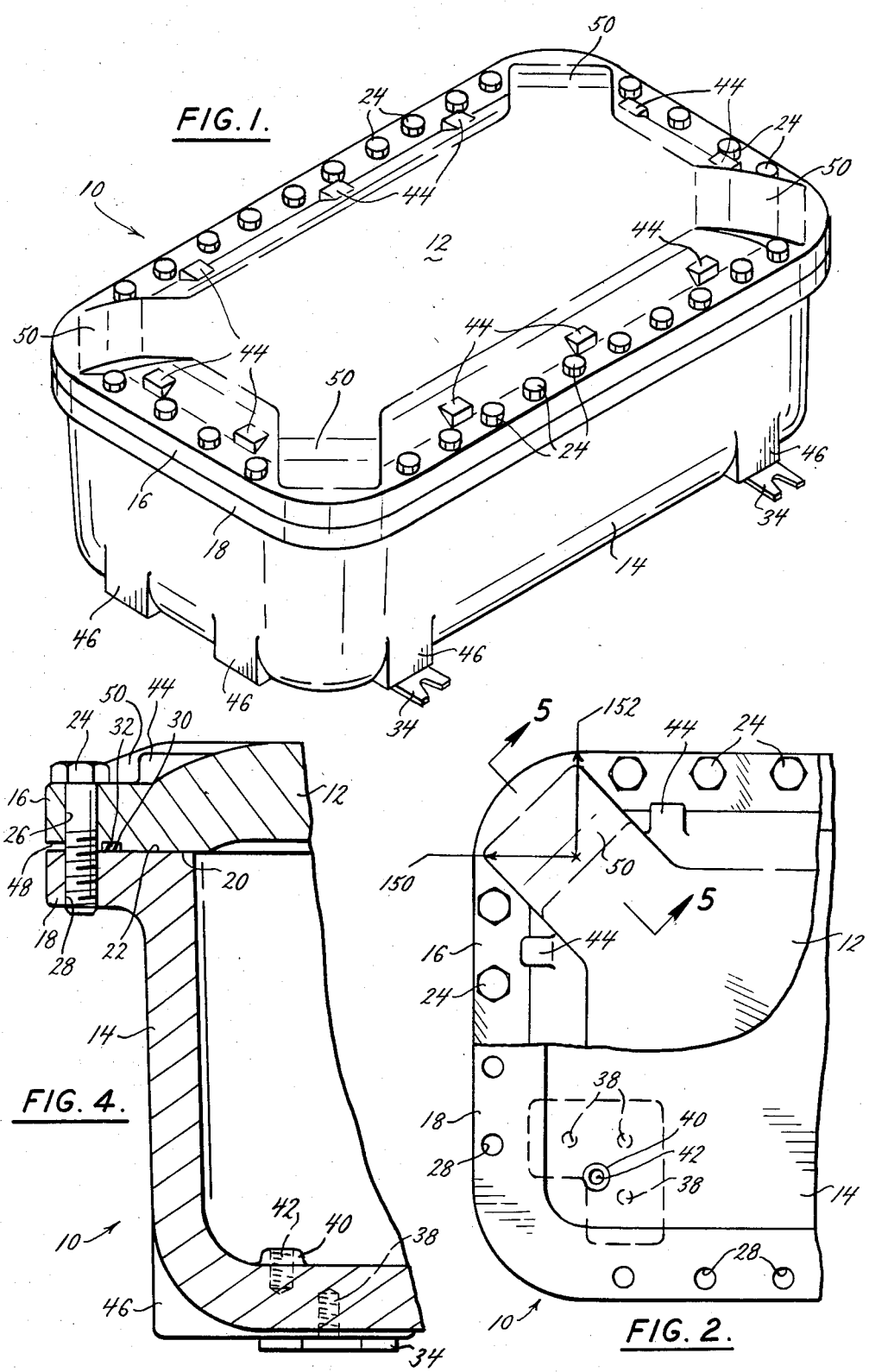

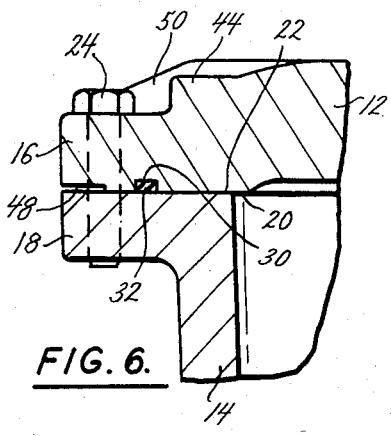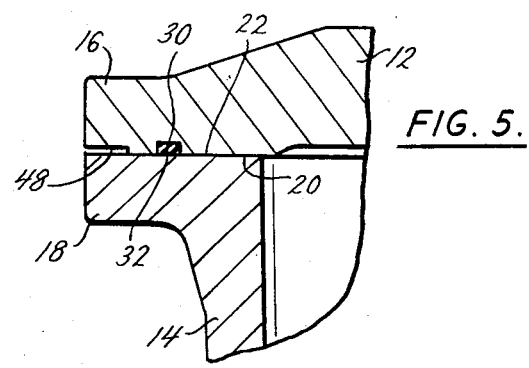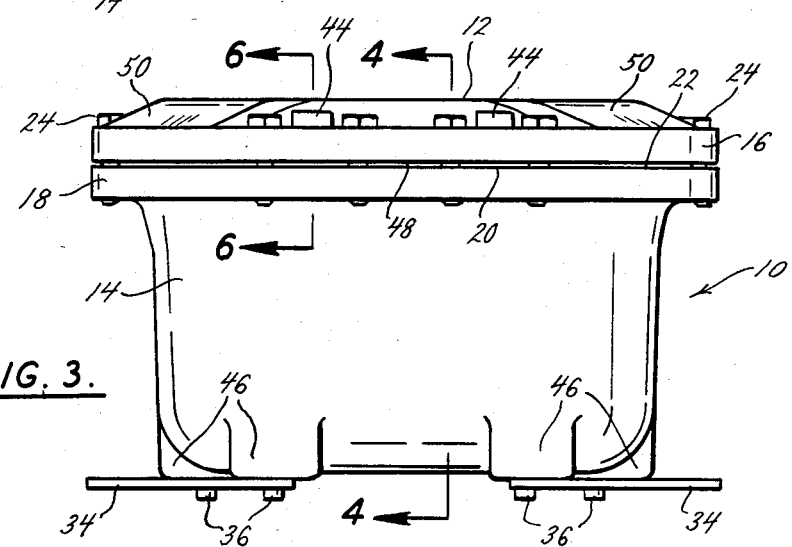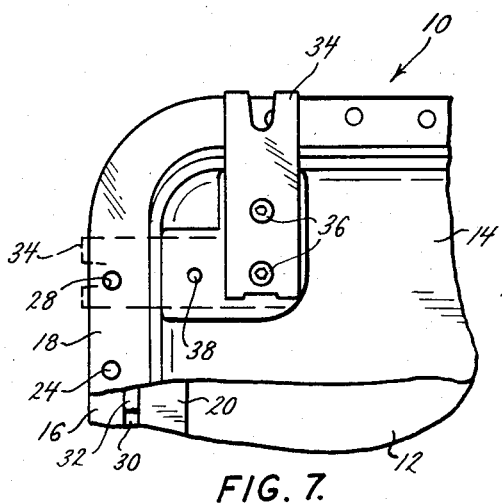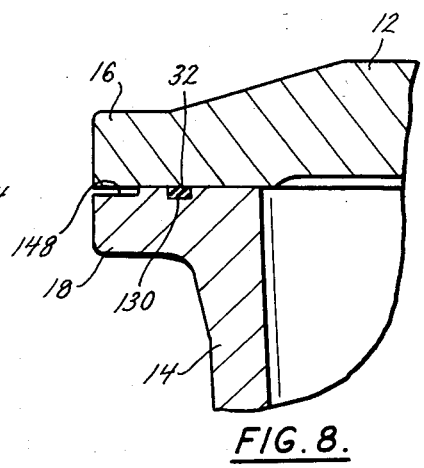

EXPLOSION PROOF ENCLOSURE

This is a continuation of co-pending application Ser. No. 787,711 filed on Oct. 15, 1985, which in turn is a continuation of application Ser. No. 634,822, filed on July 26, 1984, both now abandoned.

BACKGROUND AND SUMMARY OF THE INVENTION

Applicants' invention relates to electrical enclosures of the explosion-proof type normally used in environments which may contain explosive mixtures of gases or dust. Applicant is aware of U.S. Pat. Nos. 3,317,072; 3,573,343; 3,582,535; 3,585,273; 3,724,706; 3,853,291; and 3,974,933, the disclosures of which are incorporated by reference herein.

The present invention relates to an enclosure, such as a cast box, in particular to an enclosure that is of the type that is especially useful as an explosion-proof receptacle for electrical apparatus that is subject to sparking. The present enclosure is preferably cast and consists of two principal parts, a box or enclosure vessel and a cover. Each of the parts is unitary in itself, being formed of a single piece of metal. The box portion may be formed with access holes which may be threaded, joined to conduit, and sealed to make a complete explosion tight path for electrical wiring, as is known in the art.

The present box is preferably made of cast aluminum and has a design such that the bolt holes are either formed in the process of casting or milling. The holes may be tapped, but may also be formed without tapping so the self tapping screws or bolts can be used to fasten the cover onto the vessel portion.

One object of the enclosure is to prevent explosions from propagating out and spreading over a wide area of a building or the like. The enclosure is strong and rigid to contain the explosion. The construction of the enclosure, particularly with mating flanges between the box and cover, make an extremely strong apparatus. By forming the box and cover reasonably accurately, machining of the parts is minimized and a tight fit adds strength to the enclosure.

Another object of the invention is to provide a seal for the fitting of the cover onto the vessel that can be provided inexpensively, yet will afford a very tight engagement. The mating flanges of the box and cover are in close contact to restrict, cool and quench burning gases resulting from an internal explosion. The flanges aid in obtaining a tight seal and make it possible to obtain long flame paths that retard escape of the flame from the box.

By placing an elastomeric type seal between the box and cover additional advantages are obtained. First, the propagation of the explosion referred to above is better contained. Second, the seals retard entry of corrosion producing chemicals and moisture. The seal thus prevents interference with the contacts, switches, and other electrical devices contained in the enclosure. The seal may be joined by an adhesive or other conventional means and installed in the enclosure vessel or in the cover, thereby eliminating some expense.

Another object is to provide lugs for the mounting of the box upon a base or another support. These lugs can be separate from the box itself. By making the lugs separate, the casting of the box is considerably simplified. And more importantly, the lugs are designed so that they can be mounted to extend either to the sides or to the ends of the box by a very simple mounting change, requiring no more than swiveling the legs about their mounting screws.

A further object of the invention is to provide a means to relieve the bolt load on the bolts joining the cover to the enclosure, in the event that an internal explosion occurs in the box. This reduces the number of bolt holes and bolts that are required, reducing the expense in manufacturing the box, and also greatly increasing the convenience of the use of the box, since fewer bolts need be installed or removed to complete an installation of the box or to examine or work in the interior of the box after installation.

A futher object of the invention is to provide means whereby the cover is made exceptionally rigid so that it will remain in explosion-retaining contact with the enclosure vessel when subjected to an internal explosion. A further object is to provide means to maintain the explosion tight seal between the cover and the enclosure vessel, while eliminating or reducing the number of bolts or other joining means.

Another object of the invention is to provide simplified access to the interior of the enclosure. By reducing the number of bolts access is made easier and quicker since fewer bolts must be loosened. Access is provided so that the seal between the box and the cover is easily broken.

Other objects will appear from the description and drawings.

DESCRIPTION OF THE DRAWINGS

FIG. 1 is a perspective view of applicants' enclosure;

FIG. 2 is a partial top view of applicants' enclosure with a cover partially broken away;

FIG. 3 is an end view of applicants' enclosure;

FIG. 4 is a partial cross-sectional view of applicants' enclosure taken along the plane of line 4—4 in FIG. 3;

FIG. 5 is a partial cross-sectional view of applicants' enclosure taken along the plane of 5—5 in FIG. 2;

FIG. 6 is a partial cross-sectional view of applicants' enclosure taken along the plane of line 6—6 in FIG. 3;

FIG. 7 is a partial bottom view of applicants' enclosure with the bottom surface partially broken away; and FIG. 8 is a partial cross-sectional view, similar to FIG. 5, showing a further embodiment.

DESCRIPTION OF THE PREFERRED EMBODIMENTS

As can be seen in the drawings, the box generally indicated at 10, includes two main portions, a cover 12 and a lower box or vessel 14. The cover 12 and the vessel 14 are flanged and are joined, the cover having a flange 16 and the lower box or vessel 14 having flange 18. The cover 12 and vessel 14 are joined by placing the mating surface 20 of flange 16 of cover 12 in cooperation with mating surface 22 of flange 18 of vessel 14, as shown in FIG. 4. Mating surfaces 20 and 22 are machined but as can be appreciated can be cast or made through other conventional means, if desired, to provide a close mating relationship between the surfaces. Bolts 24 pass through holes 26 in cover flange 16 and thread into holes 28 of vessel flange 18 to clamp cover 12 to vessel 14. Holes 26 and 28 may be formed in cover 12 and vessel 14 by a variety of techniques. They may be bored or drilled into flanges 16 and 18 or may be cast into flanges 16 and 18, as desired. If more precision is required than casting allows, the holes may be cast and reamed. Holes 28 in flange 18 of vessel 14 may be threaded to receive bolts 24 or bolts 24 may be of the self-threading type. It will be appreciated that cover 12 and vessel 14 may be cast of electrical grade aluminum and can receive self-threading bolts. Alternatively, bolts with nuts could be used.

Cover 12 may also have an annular relieved portion 30 in flange 16, as shown, which can receive an elastomeric seal 32. The elastomeric seal 32 is preferably joined to cover 12 by an adhesive, not shown, but may also be joined by other methods known in the art. It will be appreciated that the relieved portion may be formed in the vessel flange 18, as shown in FIG. 8 at 130, and seal 32 may be installed therein.

Vessel 14 may have a plurality of lugs 34 which are joined to the bottom of vessel 14 by bolts 36 as shown. Bolts 36 cooperate with bolt holes 38 in the bottom of vessel 14 so that lugs 34 may be affixed to the bottom of vessel 14. Holes 38 are placed in vessel 14 at the corners of the bottom in a triangular pattern, as shown. This pattern allows lugs 34 to be selectively installed in either of two positions, as shown in FIG. 7, extending at 90° angles to each other. This selectivity of installation allows lugs 34 to be used in a variety of mounting arrangements which gives great flexibility to the use of the enclosure 10 in a variety of mounting environments. It will be appreciated that bolt holes 38 may be produced by a variety of techniques as noted for holes 26 and 28. If desired, self-threading bolts 36 may be used or holes 38 may be threaded.

As shown in FIG. 4, vessel 14 may be provided with reinforced bosses 40 in the interior, as shown. Reinforced bosses 40 may be provided with holes 42 which may be threaded, if desired. Holes 42 and reinforced bosses 40 provide mounting sites for fastening electrical connectors and other apparatus at a fixed location in the interior of vessel 14. It will also be appreciated that the side and end walls of vesel 14 may be provided with additional reinforced bosses and access holes, not shown, for connection to conduit and other electrical apparatus, as is known in the art.

Cover 12 may be provided with milling lugs 44 and vessel 14 may be also provided with milling lugs 46, as shown in FIG. 1. Milling lugs 44 and 46 allow the cover 12 or the vessel 14 to be held in a fixed position on a milling machine during desired machining operations, such as flattening mating surfaces 20 and 22, for example.

Of particular importance is relieved portion 48 in cover 12, as shown in FIG. 5. It will be appreciated that the relieved portion may also be provided in flange 18 of vessel 14, as shown as 148 in FIG. 8. These relieved portions 48 or 148 allow for a reduction in the stress loading of bolts 24, particularly if an explosion should occur in the interior of vessel 14. The stress reduction may be to one-third of the previous bolt load, for example. The reduction in stress load on bolts 24 allows a further decrease in the total number of bolts 24 required to fasten cover 12 on vessel 14 in an explosion-containing manner. Further, with applicants' new cover structure, as disclosed herein, it is even possible to totally eliminate bolts in some portions of the enclosure vessel and cover combination, such as at the corners. Relieved portions 48 and 148 extend about to the center line of bolts 24. These relieved portions 48 and 148 increase the mechanical advantage of the bolts 24 in retaining cover 12 on vessel 14 in an explosion-containing relationship in the event of an explosion or other high internal pressure in the enclosure 10. Relieved portions 48 and 148 reduce the prying action around bolts 24 when the cover 12 is subjected to any internal pressure, that is, relieved portions 48 and 148 prevent the flange 16 of cover 12 from acting as a lever having a fulcrum at the periphery of the flanges 16 and 18.

Relieved portions 48 and 148 may also be used for removing the cover 12 from vessel 14. By placing a prying tool (not shown) into the relieved portion 48 or 148 and using the prying tool as a lever to pry the cover 12 from the vessel 14. Prying may be required since the mating surfaces 20 and 22 along with elastomeric seal 32 provides a tight seal. However, the prying tool must be carefully placed so that the mating surfaces 20 and 22 and elastomeric seal 32 are not damaged.

With the introduction of applicants' stiffening structure 50, shown in FIGS. 1 and 6, it is possible to entirely eliminate the bolts from the flange portions at the corners of cover 12 and vessel 14 throughout an area spanning a substantially 90° arc at the corner. As shown, the arc without bolts has a radius 150 approximate to that of the radius 152 of flanges 16 and 18, see FIG. 2. Applicants' stiffening structure 50 is an area of increased thickness in the metal of cover 12 in the vicinity of flange 16 and spanning the chordal distance of the arc of the corner of cover 12. The stiffener 50 extends from the central portion of cover 12 substantially into the area of flange 16 and may terminate closely adjacent to the edge of flange 16. Stiffening structure 50 provides an area of substantially increased stiffness in the flange at the corners so that no additional bolts are necessary to hold the flange 16 in a close mating relationship with flange 18 of vessel 14, even when the enclosure 10 is subjected to an internal pressure such as occurs from an internal explosion.

The thickness of stiffener 50 approximates that of the central portion of cover 12, plus the thickness of flange 16, as shown in FIG. 4. Stiffening structure 50 tapers gradually from the central portion of cover 12 to blend with the flange 16 at its outermost extremity, as shown.

Applicants have found that it is helpful to increase the overall strength of cover 12, by making it slightly thicker. The slight addition of material increases the stiffness of cover 12 and also increases its bursting strength. However, the addition of material, or lack thereof, is not critical, since the stiffener 50 increases the stiffness of the cover 12 and responds to the stresses at the center of cover 12.

There are various changes and modifications which may be made to applicants' invention as would be apparent to those skilled in the art. However, any of these changes or modifications are included in the teaching of applicants' disclosure. It is intended that the invention be limited only by the scope of the claims appended hereto, and their equivalents.

We claim:

1. An electrical enclosure having a vessel and a cover for the vessel, the cover being joined in an explosion containing relationship with the vessel, the enclosure having fastening means joining the cover to the vessel and means to reduce the number of fasteners required to hold the cover in an explosion containing relationship with the vessel, including flanges joining the vessel and the cover, the cover having a corner and having means to increase the stiffness of the cover at the corner, including a projection of increased thickness in the flange area of the cover extending from a central area of the cover into the flange at the corner of the cover, the means being effective to at least partially eliminate the requirement for fasteners at the corner.

2. The enclosure of claim 1 wherein the fastener reducing means includes a relieved portion in at least one of the flanges, the relieved portion being positioned at the outer periphery of the flange to remove that portion of the flange at the outer periphery of the flanges from contact with its cooperating flange.

3. An electrical enclosure for use in locations where explosive mixtures of gases or dust are present, the enclosure preventing the propagation of explosions initiated by sparking of apparatus contained in the enclosure, the enclosure having a vessel and a cover for the vessel, the cover and the vessel having mating flanges joining the cover and vessel, the enclosure having fasteners joining the mating flanges and stiffening means to reduce the stress on the fasteners when the enclosure is subjected to an internal explosion, the enclosure having a corner, the stiffening means including a projection of increased thickness in the flange of the cover extending from a central area of the cover into the flange at the corner of the cover, the stiffening means being effective to at least partially eliminate the requirement for bolts at the corner.

4. The enclosure of claim 3 wherein the fasteners comprise bolts through the flanges retaining the cover and vessel in an explosion containing relationship, the flanges having mating surface areas providing means to restrict, cool and quench flames resulting from an internal explosion, the stress reducing means including a relieved portion on at least one of the flanges, the relieved portion being positioned at the outer periphery of the last-named flange to remove the outer periphery of that flange from contact with its mating flange.

5. The enclosure of claim 3 wherein the enclosure has an elastomeric seal at the joint between the cover and the vessel, and recess means for receiving the seal.

6. An electrical enclosure having a vessel and a complimentary cover, the vessel and cover being joinable in an explosion-containing relationship and when so joined retaining the force of an explosion and retarding the propagation of flame from the explosion when subjected to internal pressure from the explosion, the cover and vessel having complementary flanges joined at mating surfaces thereon, the vessel and cover having corners in the vessel and on the complementary flanges, the enclosure having an elastomeric seal between the flanges, the enclosure having bolts through the flanges joining the flanges in an explosion-containing relationship, the bolts being at spaced locations along the flanges, at least one of the flanges having a relieved portion extending inwardly along the mating surface of the flange from the outer periphery of the flange to a location approximately that of the centerline of the bolts through the flanges, the relieved portion providing means for reducing the stress load on the bolts when the vessel is subjected to internal pressure from an explosion or the like and permitting a reduction in the number of bolts required to retain the cover and vessel in an explosion-containing relationship, the cover flange having arcuate corners and having means to increase the stiffness of the cover including means to increase the stiffness of the cover at the corners thereof and permit elimination of the requirement for bolts at the corners while retaining the cover and the vessel in an explosion-containing relationship, the means to increase the stiffness of the cover at the corners including projections of increased thickness in the flange area of the cover extending from the central area of the cover into the flange at the corners thereof, the projections extending across the chord of an approximately 90° arc in the corners of the cover, the radius of the 90° arc being approximately that of the radius of curvature of the arcuate corner of the cover flange, the projections diminishing in thickness at a location adjacent to the flange periphery and blending therewith.

* * * * *